J. E. MacKAY.
TIRE.
APPLICATION FILED JUNE 8, 1916. RENEWED MAY 5, 1919.
1,324,165.  Patented Dec. 9, 1919.
3 SHEETS—SHEET 1.
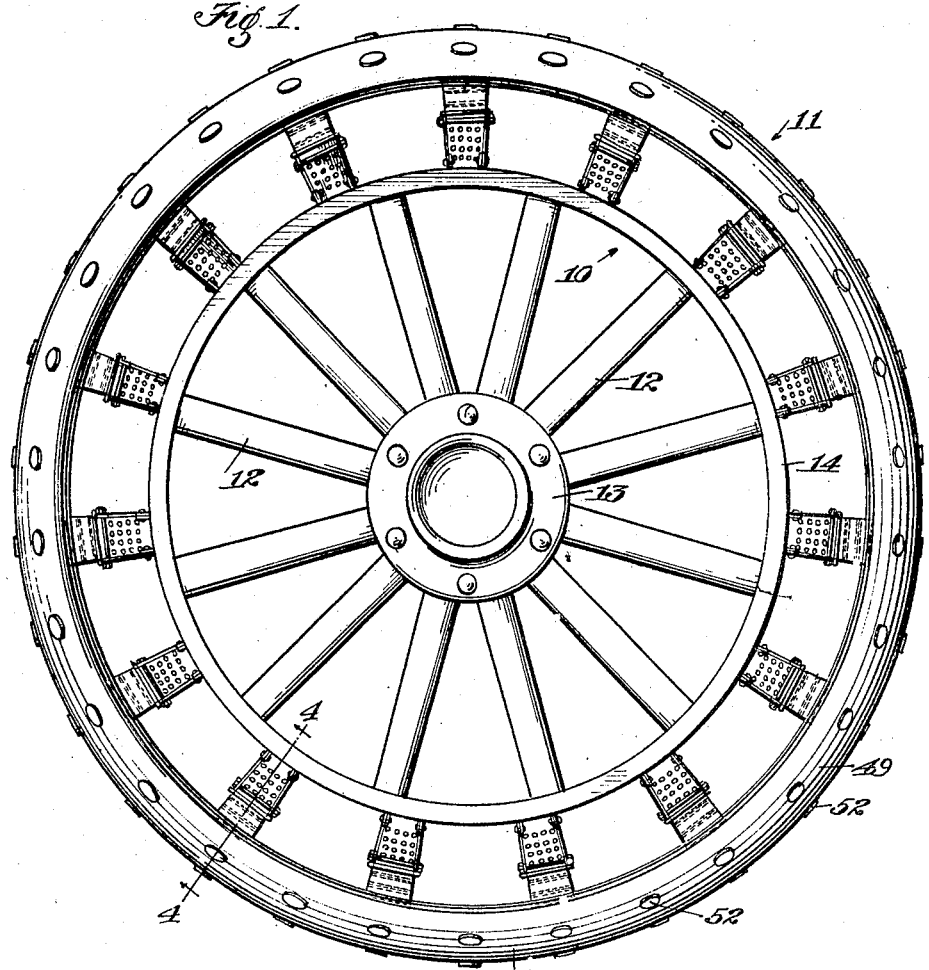
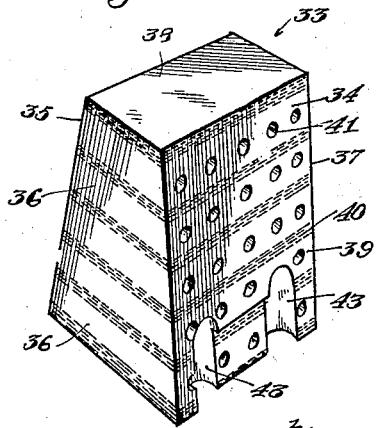
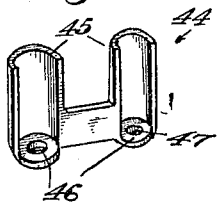
Inventor,
Joseph E. MacKay
by Hazard Berry & Miller
Attys.

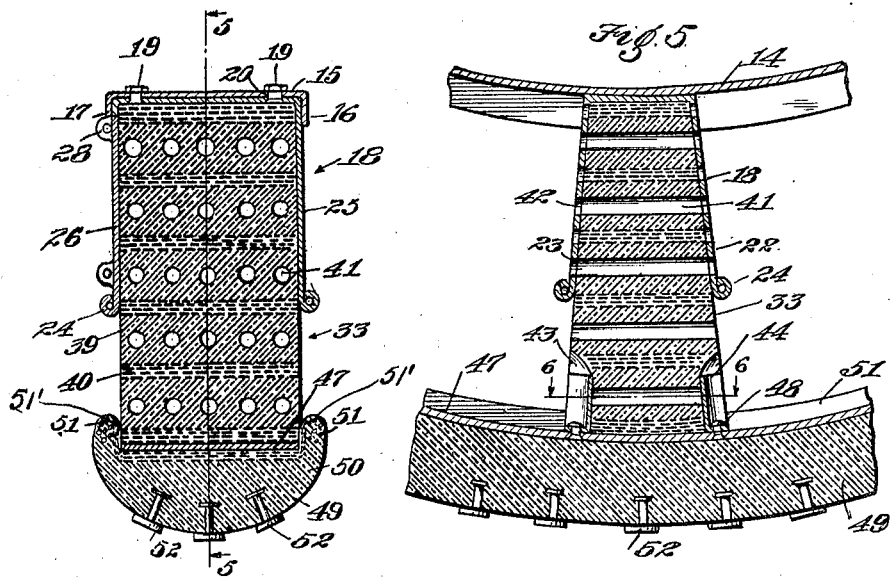

J. E. MacKAY.
TIRE.
APPLICATION FILED JUNE 8, 1916. RENEWED MAY 5, 1919.

1,324,165. Patented Dec. 9, 1919.

INVENTOR:
Joseph E. MacKay.

UNITED STATES PATENT OFFICE.

JOSEPH E. MACKAY, OF LOS ANGELES, CALIFORNIA.

TIRE.

1,324,165.　　　　　Specification of Letters Patent.　　Patented Dec. 9, 1919.

Application filed June 8, 1916, Serial No. 102,471. Renewed May 5, 1919. Serial No. 295,031.

*To all whom it may concern:*

Be it known that I, JOSEPH E. MACKAY, a citizen of the United States, residing at Los Angeles, in the county of Los Angeles and State of California, have invented new and useful Improvements in Tires, of which the following is a specification.

My invention relates to vehicle tires and particularly pertains to an improved construction in resilient vehicle tires.

It is an object of this invention to provide a resilient tire construction which may be readily applied to a wheel of common design and which will afford the vehicle axle a limited floating movement both longitudinally and transversely of the wheel rim.

It is another object to provide a resilient vehicle tire which embodies the use of demountable yieldable units positioned around the periphery of the wheel and adapted to absorb a percentage of the road shock which would otherwise be transmitted to the axle.

A further object is to provide a resilient tire with an annular yieldable rim member which is adapted to supplement the demountable yieldable unit in absorbing road shocks.

Another object is to provide a resilient tire with yieldable units of a resilient nature and which are so formed as to insure against the deterioration of the material from which said units are made.

A further object is to provide said resilient units with mounting means whereby the units may be readily secured in place or removed therefrom.

It is an object to provide a tire of the class described with a traction tread which may be easily mounted in position and will at all times conform to the yield of the tire body.

It is an object to provide a mounting for the resilient units which will insure adequate ventilation for the engaged portion of the unit.

It is another object to provide a vehicle tire of a simple construction and which will be so designed and manufactured that its life will be greater than that of the ordinary tire, and not subject to injury by use.

Other objects will appear hereinafter.

The invention is illustrated in the accompanying drawings in which:

Figure 1 is a view in side elevation of the vehicle wheel which is equipped with the resilient tire.

Fig. 2 is a view in perspective of one of the resilient units used in the construction of the tire.

Fig. 3 is a view in perspective of the mounting means employed in securing the units in position upon the tire band.

Fig. 4 is a view in vertical section as seen on the line 4—4 of Fig. 1, and shows the relation between the vehicle wheel, the resilient units, and the traction tread of the tire.

Fig. 5 is a view in vertical section as seen on the line 5—5 of Fig. 4.

Fig. 6 is a view in horizontal section through one of the resilient units as seen on the line 6—6 of Fig. 5.

Fig. 7 is a perspective view of a socket member within which a resilient unit is adapted to be positioned, the view showing a hinge member in its opened position.

Fig. 8 is a perspective view similar to Fig. 7 and shows the socket member as in its operative condition.

Figure 9:
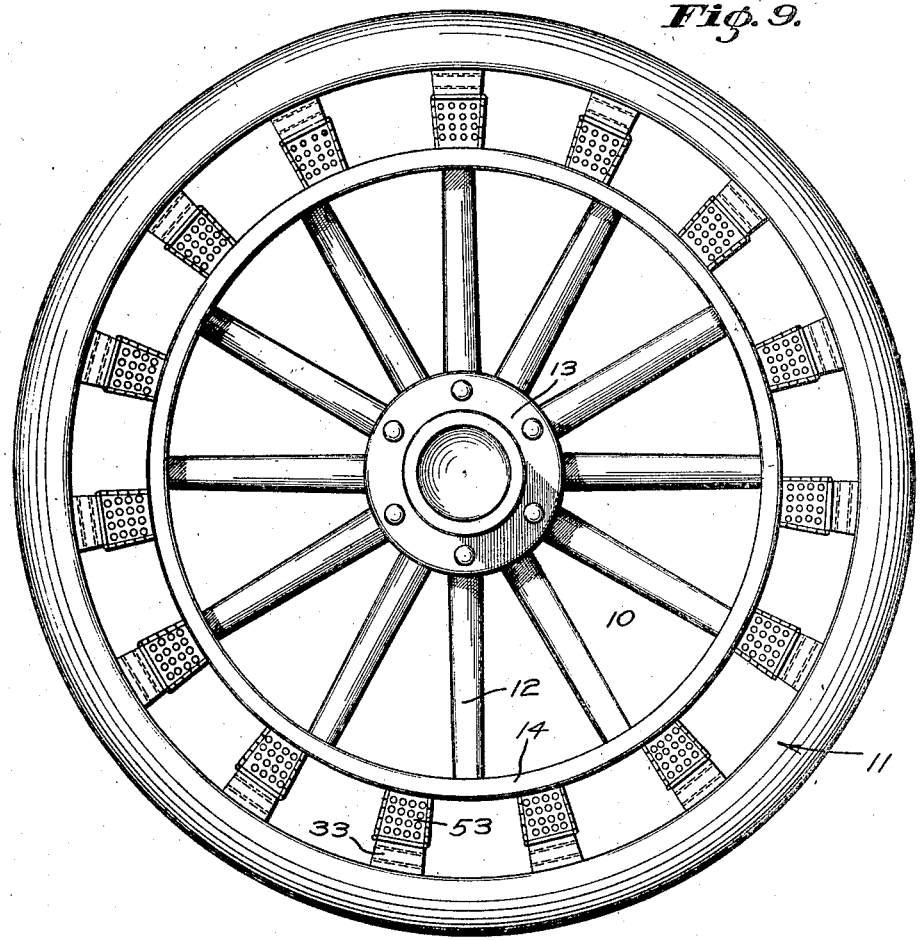
Fig. 9, illustrates a modified form of the invention in which the socket members are shown as vertically hinged instead of horizontally, as in the preferred form.

Referring to the drawings, 10 indicates a vehicle wheel fitted with the resilient tire 11. The wheel 10 is constructed in the usual manner with a series of spokes 12, a hub mounting 13, and a rim 14. The rim 14 may or may not be the conventional clencher rim used with pneumatic tires. Referring particularly to Fig. 4, the rim is shown as being formed with an annular body portion 15 and side flanges 16 and 17, thus making the transverse section of the rim channel-shaped and having its channel opening around its outer periphery.

The resilient tire construction embodied in this invention is adapted to be secured to the annular wheel rim 14 and within the channel formed around the rim. Socket members 18 are disposed equi-distantly around the rim 14 and secured thereto by means of bolts or screws 19 which pass through openings 20 in the end wall 21 of said socket members and engage the rim of the wheel. The socket members are here shown as substantially rectangular in shape and have radial side walls 22 and 23 which lie upon planes radial to the center of the wheel. Bead members 24 are formed around the terminating edges of the sides of the sockets. The rear wall 25 of the socket is substantially vertical and also has a bead 24 along its lower edge. A front wall 26 is mounted in a pivoted manner by means of ears 27 which are formed integral with it and which are pivotally secured to ears 28 upon the body of the socket by means of pivot pins 29. A pair of complementary ears 30 are formed upon the body of the socket and are provided with openings 31 for the reception of a locking bolt 32 which is adapted to secure the member 26 in position as indicated in Fig. 8 and to also tie the side walls of the socket together in a manner to resist the strain which will be exerted between them.

The socket members 18 have mounted within them resilient blocks 33. One of the blocks 33 is shown in Fig. 2 and is illustrated as being substantially wedge-shaped and having a horizontal cross section of rectangular shape, but other specific shapes may be employed as occasion may require. The sides 34 and 35 are tapered to lie in register with the side walls 22 and 23 of the socket members, which walls have been described as lying radial to the center of the wheel. The end walls 36 and 37 are vertical and of a width to snugly fit between the back wall 25 and the hinged front wall 26 of the socket members. The ends 38 of the resilient blocks are of a dimension which will allow them to securely fit within the end of the socket and rest upon the end 21 of said socket. In this manner the blocks are provided anchorage around the periphery of the vehicle wheel and adapted to extend longitudinally and radially therefrom.

The resilient blocks 33 are composed of a suitable number of layers of rubber 39 and fabric 40 alternately disposed upon each other and lying in a plane which will be disposed transversely to the action of pressure and shock upon the vehicle wheel. The fabric portions 40 are formed of coarse material and allow the rubber to become impregnated throughout the weave of the fabric. In this manner the entire resilient block is formed into a single composite mass and in a manner that will allow the fabric to reinforce the block and in a measure determine its resiliency. The interposed rubber sections 39 which are laminated alternately between the fabric portions are formed with laterally extending bores 41 which are disposed in horizontal alinement throughout the width of each rubber section. This construction is embodied in the resilient plugs for two reasons, first, to determine optionally the amount of resiliency the blocks will have, and second, to provide suitable ventilation through the body of the block, it having been found that when the rubber block is inclosed without a circulation of air, it will deteriorate rapidly, and this construction prevents such an action. A series of perforations 42 are made through all of the walls of the socket members to allow air to pass to the bores 41.

Recesses 43 are formed adjacent the lower end of the resilient blocks and upon the radial sides thereof for the reception of mounting members 44 which are composed of two semi-annular pin portions 45 which are formed at their bases with ears 46 and are adapted to be secured to an annular resilient tire band 47 by means of rivets 48 which pass through openings in the ears 46 and engage the band. This construction makes it possible for the resilient block members to be readily slipped into position and positively secured.

The annular yieldable tire band 47 extends around the entire wheel and engaged in the manner previously described by each of the series of resilient blocks 33. The tire band is formed as shown in the drawings, of spring metal and is of a sectional size to be sensitive to a certain amount of road shock imparted to the wheels and will in this manner act to increase the resilient properties of the tire. This band further provides a support or bearing for the resilient blocks 33 and may be made in a continuous annular strip or with connected ends.

A traction tread 49 is demountably secured upon the outer periphery of the yieldable tire band 47. The tread portion 49 is here shown as comprising a fabric reinforcing strip which is embedded within the member and disposed around the inner perimeter of said member in a manner to form a seat for the spring band 47. The fabric portion extends across the face of the spring band and has upturned marginal edges which bear against the edges of the band in a manner to afford it a suitable bearing surface which will protect the body of the thread portion from the wear and spreading caused by the movement of the band. The marginal edges of the fabric terminate within bead portions 51 which are annular and are formed upon the inner circumference of the tread member 49. The beads 51 are provided with a series of reinforcing wires 51' which extend continuously around the beads and are embedded therein. The body of the tread upon which said beads are formed is arcuate in cross section as indicated in Fig. 4 by means of the numeral 50. Traction buttons 52 formed of a metal are embedded within the surface of the traction tread and shield the body of the tire from excessive wear.

In the assembly of the tire upon the vehicle wheel the hinged members 26 are first swung outwardly from the socket 18 in a manner to allow the resilient blocks 33 to be inserted within the sockets, the blocks 33 having been previously positioned between the engaging members 44 which are riveted to the yieldable tire band. It will be seen that the tire and wheel are each assembled in a complete unit, one comprising the wheel with its sockets 18 disposed around the periphery of the wheel and extending in an outward direction. The other comprises the traction tread 50, the yieldable tire band 47, and the series of resilient blocks 33 which are disposed around the periphery of the tire band and adapted to register with the sockets 18. The second-named unit is now placed in position and the hinged sides 26 of the sockets 18 are closed and secured by means of the bolts 32 which pass through ears 30 and over the face of the hinged members 26, thus securing the entire socket as though it were constructed of one piece.

Figure 10:
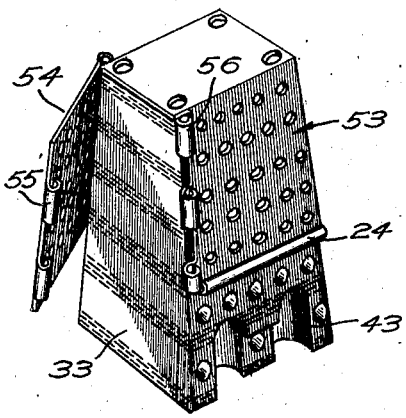
Fig. 10 is a view in perspective of one of the socket members disclosed in Fig. 9 of the drawings, the same being shown in an opened position.
Figure 11:
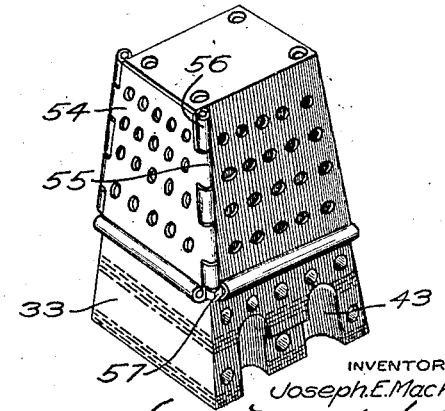
Fig. 11 is a view in perspective illustrating the parts shown in Fig. 10 and particularly discloses the closed position of the socket.

The manner of assembling the tire and wheel constructed as illustrated in the modified form shown in Figs. 9, 10 and 11 of the drawings is substantially the same as the previous operation. The sockets 53 are opened along their side by a vertically hung door 54 and the resilient members are positioned therein. When the door is closed the cylindrical bolt receiving portions 55 upon the door register with similar portions 56 upon the side of the socket. A locking bolt 57 is then passed through all of the members 55 and 56 and screwed within the upper member and in engagement with threads therein, thus securely locking the socket.

The manner in which the tire operates is evident as pressure exerted upon the wheel by the weight of the vehicle will cause force to be delivered in a downwardly direction, this force causing the resilient blocks to be compressed. The beads 24 around the sockets are provided to prevent the blocks from being cut by the edge of the sockets when said blocks are depressed and distorted. The quality of the rubber used within the blocks and the amount disposed between the fabric sections will determine the resiliency afforded by the tire. Violent road shocks acting upon the traction tread will be transmitted to the yieldable tire band and partly absorbed thereby before being delivered to the resilient blocks.

It will thus be seen that the tire herein disclosed may be readily mounted upon an ordinary vehicle wheel, removed therefrom, and will act to absorb a maximum amount of vibration and road shock without the use of pneumatic cushion means.

I claim:

1. In a tire, the combination with a vehicle wheel, of a tread portion disposed around said wheel, a series of resilient members interposed between said tread portion and the wheel, said resilient members each comprising a series of alternate layers of a resilient substance and a fabric, said resilient portions being formed to allow a free circulation of air through them, means whereby said resilient members may be demountably secured to said tread portion, and means for demountably securing said resilient members to the periphery of the vehicle wheel.

2. In a resilient tire, a series of cushion blocks each comprising layers of a resilient substance, layers of a fabric material alternately disposed in relation to said resilient substance, the series of layers being laminated to form a conglomerate mass, and means whereby a circulation of air may be allowed through the layers of resilient substance.

3. In a tire, the combination with a vehicle wheel, of a flexible annular tire band disposed therearound, a resilient tire tread mounted upon said band, a series of resilient members interposed between said band and the wheel, said resilient members each comprising a series of alternate layers of a resilient substance and a fabric, and means for demountably securing said resilient members to the periphery of the vehicle wheel and in engagement with the tire band.

4. In a tire, the combination with a vehicle wheel, of a resilient tire band encompassing said wheel, a resilient tire tread disposed over said band, a series of resilient blocks interposed between the outer periphery of the wheel and the inner periphery of the band, protrusions extending from the inner periphery of the band between which the outwardly extending ends of the blocks seat, and socket members permanently secured to the outer periphery of the wheel and adapted to demountably hold the inner ends of the blocks in a positive manner.

5. In a tire, the combination with a vehicle wheel, of a series of resilient blocks disposed around said wheel, socket members within which the inner ends of said blocks are removably secured, an annular tire band positioned over the outwardly extending ends of said blocks, and sets of spaced pins secured to the inner periphery of said tire band and between which the outer ends of said blocks may be removably secured.

6. A resilient tire block comprising flat rectangular sheets of a resilient material,— flat rectangular sheets of fabric alternately disposed in relation to the resilient material, and air passage ways extending through the resilient material the width thereof; said sheets of resilient material and fabric being constructed to form a unitary resilient block.

7. In a tire the combination with a vehicle wheel of a resilient annular tire band circumscribing said wheel and spaced in relation thereto, a series of resilient blocks interposed there between and in spaced relation to each other; said blocks having sides in planes radial with the center of the wheel; socket members fixed to the periphery of the wheel and adapted to securely hold the inner ends of the blocks; means for detaching the blocks therefrom; pins secured to the inner periphery of said band recesses formed at the opposite sides of the blocks, adjacent the outer ends thereof, to receive the pins and secure the tire band in position.

In testimony whereof I have signed my name to this specification.

JOSEPH E. MacKAY.